US009047587B2

(12) United States Patent
Slakman et al.

(10) Patent No.: US 9,047,587 B2
(45) Date of Patent: Jun. 2, 2015

(54) INCORPORATING ELECTRONIC COMMUNICATION DATA CONTENT INTO AN ENTERPRISE WORKSPACE

(75) Inventors: Nir Slakman, Walldorf (DE); Yan Vulich, Walldorf (DE); Pavel Lomonosov, Walldorf (DE); Pavel Kravets, Walldorf (DE)

(73) Assignee: SAP Portals Israel Ltd, Ra'anana (IL)

( * ) Notice: Subject to any disclaimer, the term of this patent is extended or adjusted under 35 U.S.C. 154(b) by 127 days.

(21) Appl. No.: 13/549,690

(22) Filed: Jul. 16, 2012

(65) Prior Publication Data

US 2014/0019507 A1    Jan. 16, 2014

(51) Int. Cl.
*G06F 15/16* (2006.01)
*G06F 17/30* (2006.01)
*G06Q 10/10* (2012.01)

(52) U.S. Cl.
CPC ..................................... *G06Q 10/10* (2013.01)

(58) Field of Classification Search
CPC .................. G06F 17/00; G06F 17/10–17/14; G06F 17/20–17/21; G06F 17/22; G06F 17/25–17/2705; G06F 17/30002–17/30017; G06F 17/3002–17/301; G06F 17/30103–17/30147; G06F 17/30286; G06F 17/30401; G06F 15/16; G06F 15/82; G06F 7/00; G06F 9/44; G06F 9/445; G06F 12/00; G06F 12/26; G06F 21/20; G06F 11/00; G05F 7/00; G06K 9/62
USPC ........................................ 709/201–206, 246
See application file for complete search history.

(56) References Cited

U.S. PATENT DOCUMENTS

| 6,014,680 | A * | 1/2000 | Sato et al. ...................... 715/234 |
| 6,026,410 | A * | 2/2000 | Allen et al. ........................... 1/1 |
| 7,032,030 | B1 * | 4/2006 | Codignotto ................... 709/246 |
| 7,849,049 | B2 * | 12/2010 | Langseth et al. .............. 707/602 |
| 8,112,430 | B2 * | 2/2012 | Bent .............................. 707/755 |
| 8,136,109 | B1 * | 3/2012 | Birdeau et al. ................ 717/175 |
| 8,166,117 | B2 * | 4/2012 | Sundstrom .................... 709/206 |
| 8,180,753 | B1 * | 5/2012 | Wang ............................ 707/705 |
| 8,364,467 | B1 * | 1/2013 | Bowman et al. ................... 704/9 |
| 8,504,626 | B2 * | 8/2013 | Nairn et al. .................... 709/206 |
| 2002/0046248 | A1* | 4/2002 | Drexler ......................... 709/206 |
| 2003/0126136 | A1* | 7/2003 | Omoigui .......................... 707/10 |
| 2005/0108267 | A1* | 5/2005 | Gibson et al. ................. 707/101 |

(Continued)

OTHER PUBLICATIONS

SAP NetWeaver Portal, "Enterprise Workspaces Overview," Jul. 2010, http://www.sdn.sap.com/irj/scn/go/portal/prtroot/docs/library/uuid/f0b75e03-ac7b-2d10-7287-fcc65a7bef3d?QuickLink=index&overridelayout=true, last accessed Jul. 2, 2012 (27 pages).

*Primary Examiner* — Brian J Gillis
*Assistant Examiner* — Boris Grijalva Lobos
(74) *Attorney, Agent, or Firm* — Fish & Richardson P.C.

(57) ABSTRACT

The disclosure describes computer-implemented methods, software, and systems for managing content of a virtual workspace that include identifying an electronic communication addressed to a communication account associated with an enterprise computing system, the electronic communication comprising unstructured data content; parsing the unstructured data content to determine one or more keywords defined by one or more specified keyword symbols; creating an enterprise workspace (EWS) object based on the determined one or more keywords and the unstructured data content; generating EWS content from the EWS object; and preparing the generated EWS content for display to the enterprise user.

18 Claims, 6 Drawing Sheets

(56) References Cited

U.S. PATENT DOCUMENTS

| | | | |
|---|---|---|---|
| 2006/0173932 A1* | 8/2006 | Cortright et al. | 707/204 |
| 2007/0106735 A1* | 5/2007 | Hardy | 709/206 |
| 2008/0091784 A1* | 4/2008 | Sundstrom | 709/206 |
| 2009/0157812 A1* | 6/2009 | Bavly et al. | 709/204 |
| 2009/0157828 A1* | 6/2009 | Agrawal | 709/206 |
| 2009/0177754 A1* | 7/2009 | Brezina et al. | 709/206 |
| 2009/0254575 A1 | 10/2009 | Kravets | |
| 2009/0259670 A1* | 10/2009 | Inmon | 707/100 |
| 2011/0141919 A1* | 6/2011 | Singh et al. | 370/252 |
| 2011/0161333 A1* | 6/2011 | Langseth et al. | 707/755 |
| 2011/0209195 A1* | 8/2011 | Kennedy | 726/1 |
| 2011/0270931 A1* | 11/2011 | Cheng et al. | 709/206 |
| 2011/0320401 A1* | 12/2011 | Mahajan et al. | 707/614 |
| 2012/0150792 A1* | 6/2012 | Yassin et al. | 707/602 |
| 2013/0226951 A1* | 8/2013 | Figueroa et al. | 707/765 |
| 2013/0290494 A1* | 10/2013 | Goudarzi et al. | 709/219 |
| 2014/0041052 A1* | 2/2014 | Follis et al. | 726/28 |

\* cited by examiner

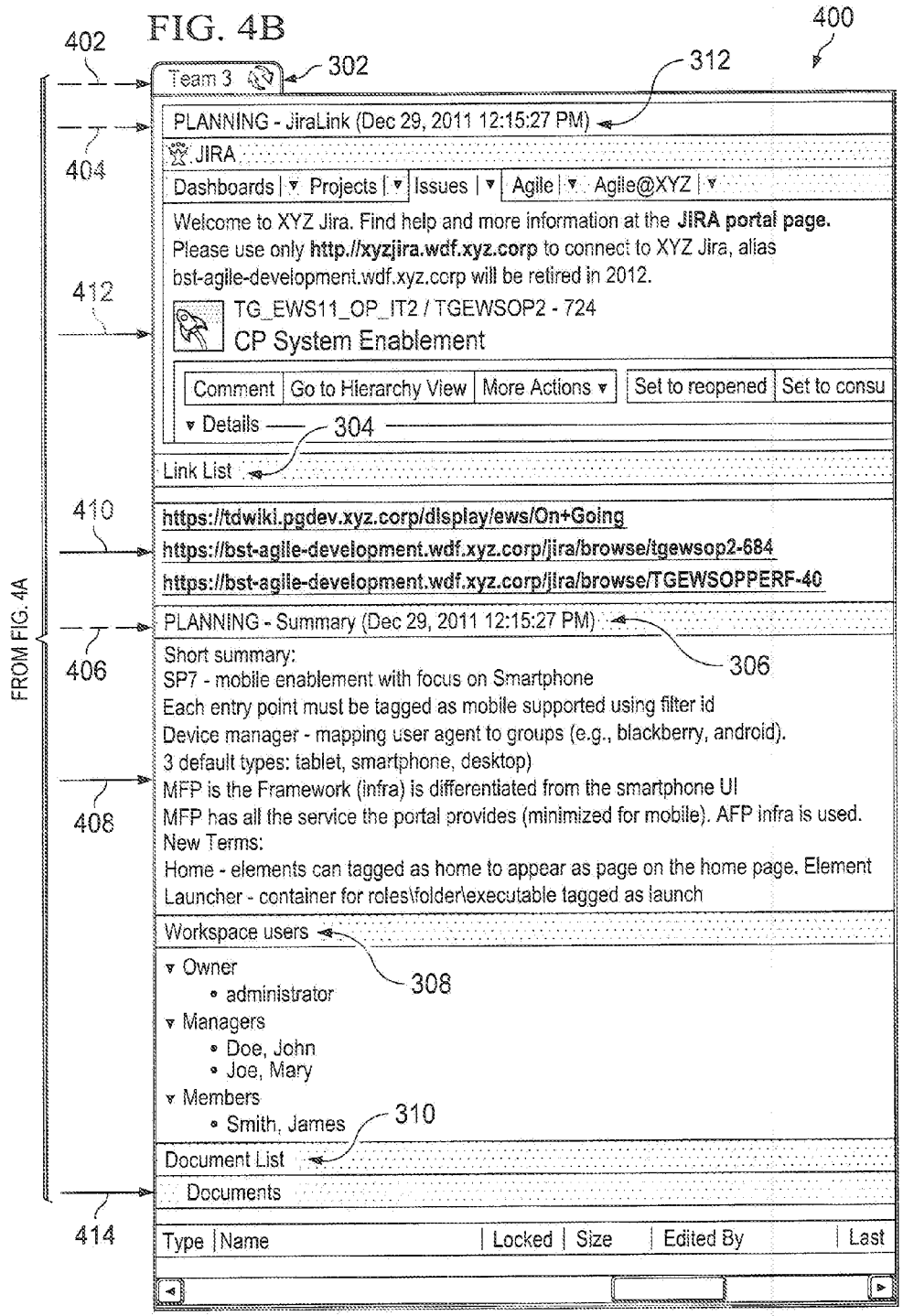

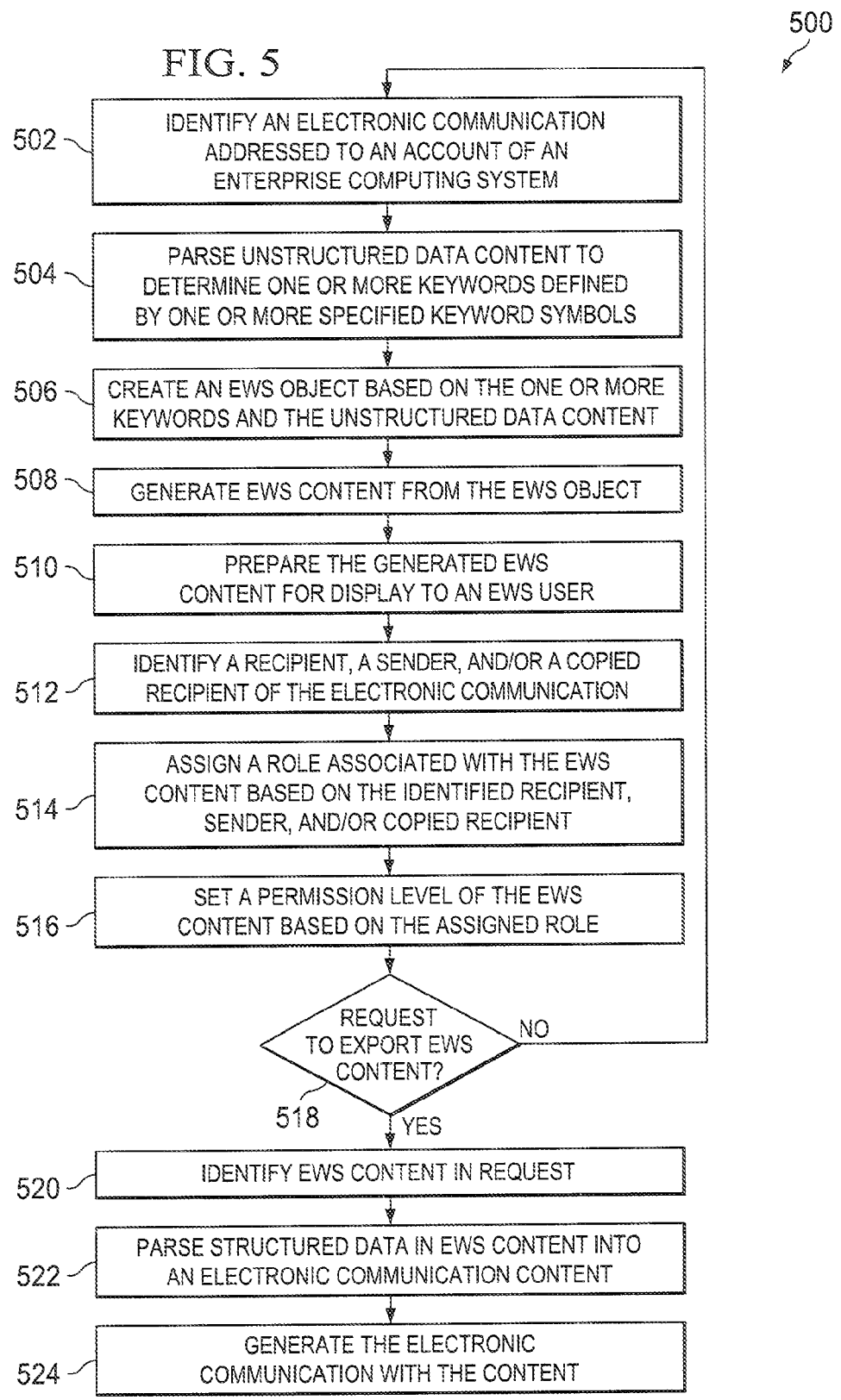

INCORPORATING ELECTRONIC COMMUNICATION DATA CONTENT INTO AN ENTERPRISE WORKSPACE

TECHNICAL FIELD

This disclosure relates to managing content of a virtual workspace and, more particularly, managing content of a virtual workspace in an enterprise environment.

BACKGROUND

An enterprise workspace provides a flexible, intuitive environment for single users and/or teams or groups of users to create, integrate, organize, compose, modify, and delete, through the use of content modules, both structured and unstructured content on customizable personal or shared pages within the enterprise workspace. A workspace may be assigned a permission/role policy that determines what content each user may see and interact with on, e.g., on a page, depending upon a permission/role assigned to the user. The use of an enterprise workspace may be resisted by organizations due to their static nature and administrative time necessary to perform updates in light of multiple possible permissions/roles that may apply to users. Further, in some instances, content management and adding content within a workspace environment can often be cumbersome. For instance, content that may only be available in unstructured objects may be difficult to add to or export from an enterprise virtual workspace.

SUMMARY

The present disclosure relates to computer-implemented methods, software, and systems for managing content of a virtual workspace in an enterprise environment. In one example implementation, a computer-implemented method for managing content of a virtual workspace includes identifying an electronic communication addressed to a communication account associated with an enterprise computing system, the electronic communication comprising unstructured data content; parsing the unstructured data content to determine one or more keywords defined by one or more specified keyword symbols; creating an enterprise workspace (EWS) object based on the determined one or more keywords and the unstructured data content; generating EWS content from the EWS object; and preparing the generated EWS content for display to the enterprise user.

In a first aspect combinable with the general implementation, the electronic communication includes an electronic mail (email) communication.

In a second aspect combinable with any of the previous aspects, the unstructured data content includes at least one of email subject data, email recipient data, email body text data, and email attachment data.

A third aspect combinable with any of the previous aspects includes identifying at least one of a recipient of the electronic communication, a sender of the electronic communication, or a copied recipient of the electronic communication.

A fourth aspect combinable with any of the previous aspects includes assigning a role associated with the EWS content based on the identified at least one of the recipient of the electronic communication, the sender of the electronic communication, or the copied recipient of the electronic communication.

In a fifth aspect combinable with any of the previous aspects, the assigned role is one of: an owner of the EWS content based on an identification of the sender of the electronic communication; a manager of the EWS content based on an identification of the recipient of the electronic communication; or a member of the EWS content based on an identification of the copied recipient of the electronic communication.

A sixth aspect combinable with any of the previous aspects includes setting a permission level of the EWS content based on the assigned role.

In a seventh aspect combinable with any of the previous aspects, parsing the unstructured data content to determine one or more specified keywords defined by one or more keyword symbols includes identifying a particular keyword arranged between two specified keyword symbols; and assigning a type to the particular keyword based on the two specified keyword symbols.

In an eighth aspect combinable with any of the previous aspects, the type of the particular keyword includes one of an EWS, an EWS page, or an EWS module.

A ninth aspect combinable with any of the previous aspects includes identifying, from the enterprise user, a request for export of a second EWS content from the virtual workspace, the second EWS content comprising structured data content defined by one or more headings.

A tenth aspect combinable with any of the previous aspects includes parsing the structured data into one or more portions of a different electronic communication based on the one or more headings.

An eleventh aspect combinable with any of the previous aspects includes generating the different electronic communication comprising the one or more portions for transmission to a different enterprise user.

The subject matter described in this specification can be implemented in particular implementations so as to realize one or more of the following advantages. For example, management (e.g., addition or export) of content to and/or from an enterprise workspace (EWS) may be more efficient by enabling import of unstructured and structured content from a variety of different sources (e.g., electronic mail and other sources). Further, such content may be automatically translated to content suitable for an EWS. In addition, content within an EWS may be automatically translated to, for instance, unstructured data for exportation to one or more other users or systems in the enterprise.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 4A-4B illustrate an example graphic mapping between unstructured data and data displayable in a virtual workspace; and FIG. 5 is a flow chart illustrating an example method for managing content of a virtual workspace.

DETAILED DESCRIPTION

Figure 1:
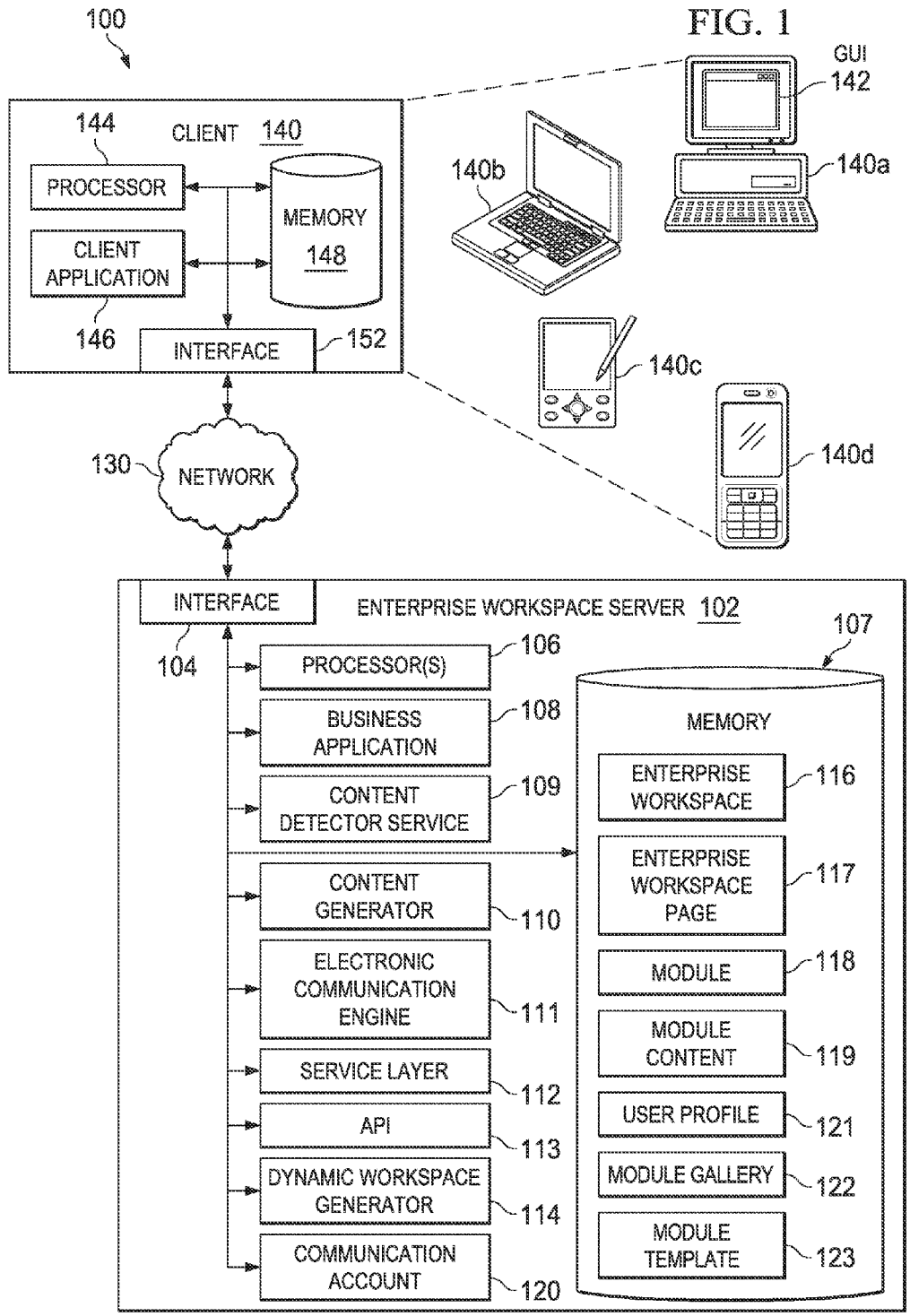
FIG. 1 is a block diagram illustrating an example system for managing content of a virtual workspace.

The disclosure generally describes computer-implemented methods, software, and systems for managing content of a virtual workspace. For example, in one example implementation, an electronic communication (e.g., an email, a text message, an IM, or other electronic communication) is identified by the enterprise computing system as addressed to a particular communication account associated with the enterprise computing system. The electronic communication may contain unstructured data, such as, for example, text data in a body of the communication, recipient information, attachments, links (e.g., URL links), sender information. The electronic communication may be parsed to determine one or more keywords defined by one or more specified keyword symbols (e.g., *, #, $, /, or other symbols) to create an enterprise workspace (EWS) object (e.g., a serialized content object) based on the determined keywords and the unstructured data content. In some aspects, new EWS content may be generated from the EWS object in the EWS of the enterprise user through an enterprise resource portal, other EWS users, and/or other enterprise computing system users.

For the purposes of this disclosure, an enterprise resource portal (ERP), also known as an enterprise information portal (EIP) or a corporate portal, is a framework for integrating information, people, and processes across organizational boundaries. An ERP provides a secure unified access point, often in the form of a web-based user interface, and is designed to aggregate and personalize information through application-specific portals. The ERP is a de-centralized content contribution and content management system, which keeps the information always updated. With only a web browser, enterprise portal users can begin work once they have been authenticated in the ERP which offers a single point of access to information, enterprise applications, and services both inside and outside an organization. ERPs may present information from diverse sources in a unified and structured way, and provide additional services, such as dashboards, an internal search engine, e-mail, news, navigation tools, and various other features. ERPs are often used by enterprises for providing their employees, customers, and possibly additional users with a consistent look and feel, and access control and procedures for multiple applications, which otherwise would have been separate entities altogether.

Enterprise Workspace (EWS) technology leverages existing ERP capabilities and may act as an "add-on" to ERP technology. For example, EWS user interface (UI) technology may run on top of existing ERP technology. EWS functionality provides a flexible, intuitive environment for single EWS users and/or teams or groups of EWS users to create, integrate, organize, compose, modify, and delete, through the use of modules, both structured and unstructured content on EWS pages within an EWS. EWS technology allows EWS users to take advantage of a "self-service," that is a decentralized, approach in assembling content on EWS pages, often without involvement by an enterprise's information technology group.

In some implementations, unstructured data may consist of data that is not divided into logical blocks. For example, unstructured data may consist of data defined in one single data block sequence where all data elements may only be separated by the sequential position. In some implementations, unstructured data may consist of data that is divided into logical blocks, where each block has its own identifier.

FIG. 1 illustrates an example distributed computing system 100. Specifically, the illustrated example distributed computing system 100 includes or is communicably coupled with an EWS server 102 and a client 140 (illustrated as various example clients 140a through 140d, referred to as "client 140") that communicate across a network 130. At a high level, the EWS server 102 is an electronic computing device operable to receive, transmit, process, store, or manage data and information associated with the example distributed computing system 100. The EWS server 102 allows EWS users to compose, modify, delete, and deploy EWS pages. Through a graphical user interface (GUI), a user of the EWS server 102, for example via a client 140, is provided with an efficient and user-friendly presentation of data provided by or communicated within the example distributed computing system 100.

In general, the EWS server 102 is a server that stores a business application 108, a content detector service 109, a content generator 110, and an electronic communication engine 111, where at least a portion of the business application 108, the content detector service 109, the content generator 110, and the electronic communication engine 111 is executed using requests/responses sent from/to a client 140 within and communicably coupled to the illustrated example distributed computing system 100 using network 130. In some implementations, the EWS server 102 may store a plurality of various business applications 108 and other components. In other implementations, the EWS server 102 may be a dedicated server meant to store and execute only a single business application 108, content detector service 109, content generator 110, and electronic communication engine 111. In some implementations, the EWS server 102 may comprise a web server, where business application 108, content detector service 109, content generator 110, and electronic communication engine 111 represents one or more web-based applications accessed and executed by the client 140 using the network 130 or directly at the EWS server 102 to perform the programmed tasks or operations of the business application 108, the content detector service 109, the content generator 110, and the electronic communication engine 111.

In some implementations, any or all of the business application 108, content detector service 109, content generator 110, and electronic communication engine 111, and/or other components of the enterprise workspace server, both hardware and/or software, may interface with each other and/or the interface using an application programming interface (API) 113 and/or a service layer 112. The API 113 may include specifications for routines, data structures, and object classes. The API 113 may be either computer language independent or dependent and refer to a complete interface, a single function, or even a set of APIs. The service layer 112 provides software services to the example distributed computing system 100. The functionality of the enterprise server 102 may be accessible for all service consumers via this service layer. Software services, such as provide reusable, defined business functionalities through a defined interface. For example, the interface may be software written in extensible markup language (XML) or other suitable language. While illustrated as an integrated component of the EWS server 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module, enterprise application, or hardware module without departing from the scope of this disclosure.

The illustrated content detector service 109 may monitor a communication account (not illustrated) (described more fully below) that is set up on the EWS server 102 and, in some aspects, associated with a particular enterprise user, enterprise group, or other well-defined entity. Upon identification of a communication (e.g., email, text message, IM, or otherwise) received at the communication account, the content detector service 109 may identify and analyze unstructured content contained in the electronic communication (e.g., text, sender data, recipient data, attachments, embedded links, and otherwise). For example, in some aspects, the content detector service 109 may identify content based on a predefined set of keywords and symbols that translate into EWS content: For example, keywords may be offset with symbols, such as ">>"; "*"; "!"; or other symbols that may be preselected and defined by, for instance, an administrator of the system 100. As one example, a communication may include a subject line of: "WS_Name>>Page_Name_#1, Page_Name_ #2>>Module_Name_Prefix." The content detector service 109 may analyze such a subject line to indicate that content in the communication should be represented and/or translated to EWS content as follows: new (or existing) EWS 116 called "WS_Name"; EWS pages 117 called "Page_Name_#1 and Page_Name_#2; and EWS module 118 called "Module_Name_Prefix." Once identified and analyzed, the content may be parsed by the content detector service 109 into one or more EWS objects (e.g., a serialized content object) according to the predefined set of keywords and symbols.

The illustrated content generator 110, in some aspects, receives the content object generated by the content detector service 109 and generates EWS content from the object. For example, the content generator 110 may generate one or more EWS 116, one or more EWS pages 117, and/or one or more EWS modules 118 according to the object and the predefined set of keywords and symbols. In some aspects, the content generator 110 may be an API based component that utilizes, for instance, the API 113 shown in FIG. 1.

The content generator 110, in some aspects, assigns various roles to enterprise users according to the content of the electronic communication. For example, a sender of the communication may be assigned a role of owner/administrator of the generated EWS content (e.g., with the ability to fully edit content). Recipients of the electronic communication may be assigned roles of managers to the EWS content (e.g., may view and edit some content). Copied recipients of the electronic communication may be assigned roles of members to the EWS content (e.g., may only view EWS content with no editing permissions). In some aspects, the role of owner/administrator may edit and modify the EWS content with conventional administrative tools or use additional electronic communications to add more content. In some aspects, the added EWS content may add to existing EWS content, such as, for example, add EWS pages to an EWS, add modules to an existing EWS pages, and so on.

In some aspects, the content generator 110 may transmit an error to an EWS user when a permission is denied. For example, if a user in the role of member tries to edit EWS content, the content generator 110 (or, for example, another component of the EWS server 102) may transmit an error message to such user indicating that there is no permission to edit the EWS content. In some aspects, further action may be taken. For example, an electronic communication (e.g., email, text, IM, or otherwise) may be sent to a user in the administrator role indicating that an attempt was made to change EWS content with insufficient permission.

The illustrated electronic communication engine 111 facilitate reception and/or transmission of some or all of the electronic communications at the EWS server 102. In some aspects, the electronic communication engine 111 may facilitate only electronic communications that are determined (e.g., by the content detector service 109) to effect (e.g., add, remove, edit, or otherwise manage) EWS content (e.g., the EWS 116, EWS page 117, module 118, and/or module content 119).

Although illustrated as separate components in the example distributed computing system 100, in some implementations, one or more of the content detector service 109, the content generator 110, and the electronic communication engine 111 may be implemented in a single application, or, alternatively, grouped together in any combination in a number of applications. For example, in some implementations, the content detector service 109, the content generator 110, and the electronic communication engine 111, as well as other illustrated components of system 100, may be configured in a single software application executable by the processor(s) 106 on the EWS server 102 (or other appliance illustrated in FIG. 1). Accordingly, although FIG. 1 illustrates these components separately, they may be implemented as sub-components of a larger application without departing from the scope of the disclosure.

In the illustrated example, the EWS server 102 is responsible for receiving application requests, for example to view, create, or define rules to create dynamic workspaces/pages and/or search for content to include in the dynamic workspaces/pages, from one or more client applications associated with the client 140 of the example distributed computing system 100. The EWS server is also responsible for responding to the received requests by processing said requests in the associated business application 108, content detector service 109, content generator 110, and electronic communication engine 111 and sending an appropriate response back to the requesting client application. In addition to requests from the client 140, requests may also be sent from internal, external, or third-party users, other automated applications, as well as any other appropriate entities, individuals, systems, or computers. According to one implementation, EWS server 102 may also include or be communicably coupled with an e-mail server, a web server, a caching server, a streaming data server, and/or other suitable server. In other implementations, the EWS server 102 and related functionality may be provided in a cloud-computing environment.

The illustrated EWS server 102 includes or is communicably coupled with a communication account. Generally, the communication account may be an addressable communication account, such as an email account, text message account, IM account, or other mailbox account to which data may be addressed and sent/received. In some implementations, the communication account may preferably be an email account set up by an administrator of the EWS server 102 and associated with one or more particular enterprise users. For example, in some aspects, each enterprise user that may manipulate, generate, and/or modify EWS content may have an associated communication account (e.g., email account) in addition to a regular enterprise account. In some aspects, each communication account (of multiple accounts) may be monitored in real-time (e.g., substantially constantly), in near real-time (e.g., periodically within short time periods), and/or periodically throughout, for example, a workday. Communications received at the communication account may be managed according to, for example, one or more processes described below.

As illustrated in FIG. 1, the EWS server 102 includes an interface 104. Although illustrated as a single interface 104 in FIG. 1, two or more interfaces 104 may be used according to particular needs, desires, or particular implementations of the example distributed computing system 100. The interface 104 is used by the EWS server 102 for communicating with other systems in a distributed environment—including within the example distributed computing system 100—connected to the network 130; for example, the client 140, as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

As illustrated in FIG. 1, the EWS server 102 includes a processor 106. Although illustrated as a single processor 106 in FIG. 1, two or more processors may be used according to particular needs, desires, or particular implementations of the example distributed computing system 100. Generally, the processor 106 executes instructions and manipulates data to perform the operations of the EWS server 102. Specifically, the processor 106 executes the functionality required to receive and respond to requests from the client 140 and/or create, integrate, organize, compose, modify, and delete EWS workspaces, pages, and/or content.

The EWS server 102 also includes a memory 107 that holds data for the EWS server 102. Although illustrated as a single memory 107 in FIG. 1, two or more memories may be used according to particular needs, desires, or particular implementations of the example distributed computing system 100. While memory 107 is illustrated as an integral component of the EWS server 102, in alternative implementations, memory 107 can be external to the EWS server 102 and/or the example distributed computing system 100.

In some implementations, the memory 107 includes one or more of an EWS 116, an EWS page 117, a module 118, module content 119, and a user profile 121. Although illustrated as single components in FIG. 1, two or more EWSs 116, EWS pages 117, modules 118, module content 119, and user profiles 121 may be used according to particular needs, desires, or particular implementations of the example distributed computing system 100.

The EWS 116 is a central repository of knowledge. EWS 116 generation may be performed either at design-time or runtime and may be based upon, for example, EWS 116 properties, an EWS 116 owner profile, EWS 116 viewer properties, and/or other suitable values. For example, the EWS 116 owner profile may include age, address, medical profile, etc. The EWS 116 viewer profile may include role, relation to the EWS 116 owner, location, etc. In some implementations, the EWS 116 is associated with a context. For example, the EWS 116 may be associated with a specific user, for example a particular heart patient, and a support group associated with the heart patient, for example, the patient's doctor, friends and family, etc. The EWS 116 may be either personal or shared. The personal EWS 116 is a private area where a single user can maintain personal content on a particular EWS page 117 not accessible by other EWS users. A shared EWS 116 is an area where multiple EWS users, for example the support group or friends and family of the heart patient, can access shared EWS pages 117. A shared EWS 116 is assigned a role/permission policy and each EWS user may be provided a role and associated permission in the shared EWS 116. Roles may be, for example, workspace owner, workspace manager, and/or workspace member. Associated permissions may be, for example, the ability to create, rename, and/or delete EWS pages 117 and view/update particular content associated with EWS pages 117 and/or specific modules 118 (described below) associated with the EWS pages 117. In some implementations, EWS users may have multiple permission levels/roles. In some implementations, users can also customize the EWS 116 with different layouts, branding, and themes. In some implementations, an EWS 116 instance is created from a reusable EWS template (not illustrated).

The EWS page 117 is a container item defining a layout to structure the position of one or more modules 118. In some implementations, EWS users may create, rename, and/or delete EWS pages 117 as well as customize EWS pages 117 with different layouts, branding, and themes. EWS users may define one or more EWS pages 117 for each EWS 116. The EWS 116 may contain, for example, static EWS pages 117, EWS page 117 templates, and/or dynamically generated EWS pages 117. Static pages are defined at design time and contain content that does not change while dynamic EWS pages 117 are dynamically created, modified, and/or deleted at runtime and contain changeable, that is "dynamic" content. In some implementations, an EWS page 117 instance is created from a reusable EWS page template (not illustrated).

A module 118 is a content item that runs in a personal or shared EWS page. Module content 119 may include, for example, applications, reports, dashboards, web content (e.g., audio, video, images, RSS feeds, etc.), and documents either from an enterprise or non-enterprise system(s). A module 118 may have abilities to respond to workspace events and may have associated back-end data and a property set. A module 118 may also be parameterized by the EWS user to allow changes to the back-end data and property set of the module 118 at runtime. In some implementations, a module 118 instance is created from a reusable module template 123. In these implementations, an EWS user may use a GUI to drag-and-drop a module template 123 from a module gallery 122 or a library of available modules templates 123 to an EWS page 117 to create a particular module 118 instance. In other implementations, methods and actions other than drag-and-drop may be used to add the module template 123 to the EWS page 117. An EWS user may edit individual properties of the created module 118 instance's property set for the purposes of the EWS page 117.

Editing may include defining a module content 119 source, location properties, user permissions/roles that may view the module 118 and/or specific module content 119, etc. The EWS user may also add, edit, and/or delete back-end data for the module 118. Backend data may include, for example, a description of the module, creator identification, date of creation, or other suitable data. In some implementations, EWS users may customize EWS pages 117 with different layouts, branding, and themes. In some implementations, the EWS user customizations of the EWS 116 and/or the EWS page 117 may automatically affect and/or supersede EWS user-defined/edited properties for a particular module 118 instance. In some implementations, generic/pre-defined modules are available that require little to no modification by an EWS user before use. In some implementations, the EWS 116, EWS page 117, and module 118 may be implemented in HTML5 or other suitable computer language.

The illustrated user profile 121 is data associated with a particular EWS user. User profile 121 may include, for example, name, department, position, salary, hire date, a role, system password, contact information, location, and other suitable data. In some implementations, the user profile 121 can be used, for example, to set permissions to view, edit, or otherwise manage content such as the EWS 116, EWS page 117, module 118, and/or module content 119.

The business application 108 is any type of application that allows the client 140 to request and view content on the client 140. In some implementations, the business application 108 can use business application data or other above-describe data stored in memory 107 to perform tasks associated with the EWS server 102 or other components of the example distributed computing system 100 communicatively coupled with the EWS server 102. Business application data may include any type of data associated with and/or used by a business application, including data repository locations, security and permissions information, or other suitable data. For example, for a business application that processes sales invoices, business application data for a specific sales invoice may include data pertaining to a particular sales invoice number, buyer, seller, date, address, product(s), quantity, price, tax rate, etc. Once a particular business application 108 is launched, a client 140 may interactively process a task, event, or other information associated with EWS server 102. The business application 108 can also be any application, program, module, process, or other software that may execute, change, delete, generate, or otherwise manage information associated with a particular client 140, and in some cases, a business process (not illustrated) performing and executing business process-related events on the EWS server 102 and/or the client 140. In particular, business processes communicate with other clients 140, applications, systems, and components to send and receive events.

Additionally, a particular business application 108 may operate in response to and in connection with at least one request received from other business applications 108, including a business application 108 associated with another EWS server 102. In some implementations, the business application 108 can be and/or include a web browser. In some implementations, each business application 108 can represent a network-based application accessed and executed using the network 130 (e.g., through the Internet, or using at least one cloud-based service associated with the business application 108). For example, a portion of a particular business application 108 may be a Web service associated with the business application 108 that is remotely called, while another portion of the business application 108 may be an interface object or agent bundled for processing at a remote client 140. Moreover, any or all of a particular business application 108 may be a child or sub-module of another software module or enterprise application (not illustrated) without departing from the scope of this disclosure. Still further, portions of the particular business application 108 may be executed or accessed by a user working directly at the EWS server 102, as well as remotely at a corresponding client 140. In some implementations, the EWS server 102 can execute the business application 108.

In some aspects, a dynamic workspace generator 114 may be included in the EWS server 102. The dynamic workspace generator 114 is a software and/or hardware engine providing functionality to dynamically create, modify, and/or delete EWSs 116, EWS pages 117, and/or modules 118. Runtime EWS 116 generation is performed by the dynamic workspace generator 114. At runtime, an EWS 116 structure, that is EWS pages 117/content layout, and/or modules 118, may not be fully defined. Generation of an EWS 116 containing dynamic content results in, for example, static EWS pages 117 (if applicable), EWS page 117 templates, and/or dynamically generated EWS pages 117. In some implementations, the dynamic workspace generator 114 can work in conjunction with the electronic communication engine 111 to perform its functionality, for example in implementing examples presented below with respect to the electronic communication engine 111. In some implementations, the dynamic workspace generator 114 can also take into account user properties to determine whether an EWS 116, EWS page 117, and/or module 118 is created, modified, and/or deleted. In some implementations, the dynamic workspace generator 114 can also determine whether an EWS 116, EWS page 117, and/or module 118 is not visible, that is filtered, for a particular user based upon the user's user properties or other suitable value.

In some implementations, the dynamic workspace generator 114 is web-based and runs in a client 140 browser window. In some implementations, the dynamic workspace generator 114 may be partially or completely provided in a cloud-computing environment. In some implementations, a particular dynamic workspace generator 114 can operate in response to and in connection with at least one request received from a business application 108 or other application. Additionally, a dynamic workspace generator 114 may operate in response to and in connection with at least one request received from another dynamic workspace generator 114, business application 108, or other components associated with the illustrated or another EWS server 102. In some implementations, each dynamic workspace generator 114 can represent a web-based application accessed and executed using the network 130 (e.g., through the Internet, or using at least one cloud-based service associated with the dynamic workspace generator 114). For example, a portion of a particular dynamic workspace generator 114 may be a web service associated with a dynamic workspace generator 114 that is remotely called, while another portion of the particular dynamic workspace generator 114 may be an interface object or agent bundled for processing at a remote client 140. Moreover, any or all of a particular dynamic workspace generator 114 may be a child or sub-module of another software module or enterprise application (not illustrated) without departing from the scope of this disclosure. Still further, portions of the particular dynamic workspace generator 114 may be executed or accessed by an EWS user working directly at the EWS server 102, as well as remotely at a corresponding client 140.

The client 140 may be any computing device operable to connect to or communicate with at least the EWS server 102 using the network 130. In general, the client 140 comprises a computer operable to receive, transmit, process, and store any appropriate data associated with the example distributed computing system 100. While FIG. 1 illustrates representative clients 140*a*-140*d* (collectively the client 140), the client 140 may take other forms without departing from the scope of this disclosure. For example, client 140 is intended to encompass any computing device such as a desktop computer, laptop/notebook computer, wireless data port, smart phone, personal data assistant (PDA), tablet computing device, one or more processors within these devices, or any other suitable processing device. The client 140 may include a computer that includes an input device, such as a keypad, touch screen, or other device that can accept user information, and an output device that conveys information associated with the operation of the EWS server 102 or the client 140 itself, including digital data, visual information, or a GUI 142, as shown with respect to the client 140.

The client 140 further includes a client application 146. The client application 146 is any type of application that allows the client 140 to request and view content on the client 140. In some implementations, the client application 146 can be and/or include a web browser. In some implementations, the client-application 146 can use parameters, metadata, and other information received at launch to access a particular set of data from the server 102. Once a particular client application 146 is launched, a user may interactively process a task, event, or other information associated with the EWS server 102. Further, although illustrated as a single client application 146, the client application 146 may be implemented as multiple client applications in the client 140.

The illustrated client 140 further includes an interface 152, a processor 144, and a memory 148. The interface 152 is used by the client 140 for communicating with other systems in a distributed environment—including within the example distributed computing system 100—connected to the network 130; for example, the EWS server 102 as well as other systems communicably coupled to the network 130 (not illustrated). The interface 152 may also be consistent with the above-described interface 104 of the EWS server 102 or other interfaces within the example distributed computing system 100. The processor 144 may be consistent with the above-described processor 106 of the EWS server 102 or other processors within the example distributed computing system 100. Specifically, the processor 144 executes instructions and manipulates data to perform the operations of the client 140, including the functionality required to send requests to the EWS server 102 and to receive and process responses from the EWS server 102. The memory 148 may be consistent with the above-described memory 107 of the EWS server 102 or other memories within the example distributed computing system 100 but storing objects and/or data associated with the purposes of the client 140.

Further, the representative client 140a illustrates a GUI 142 applicable to the remainder representative clients and the client 140 in general. The GUI 142 provides a visual interface with at least a portion of the example distributed computing system 100. Generally, through the GUI 142, an EWS server 102 user is provided with an efficient and user-friendly presentation of data provided by or communicated within the example distributed computing system 100. In particular, the GUI 142 may be used to view and navigate EWS pages served by EWS server 102 as well as create, integrate, organize, compose, modify, and delete both structured and unstructured content on EWS pages within personal and/or shared workspaces.

There may be any number of clients 140 associated with, or external to, the example distributed computing system 100. For example, while the illustrated example distributed computing system 100 includes one client 140 communicably coupled to the EWS server 102 using network 130, alternative implementations of the example distributed computing system 100 may include any number of clients 140 suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

Figure 2:
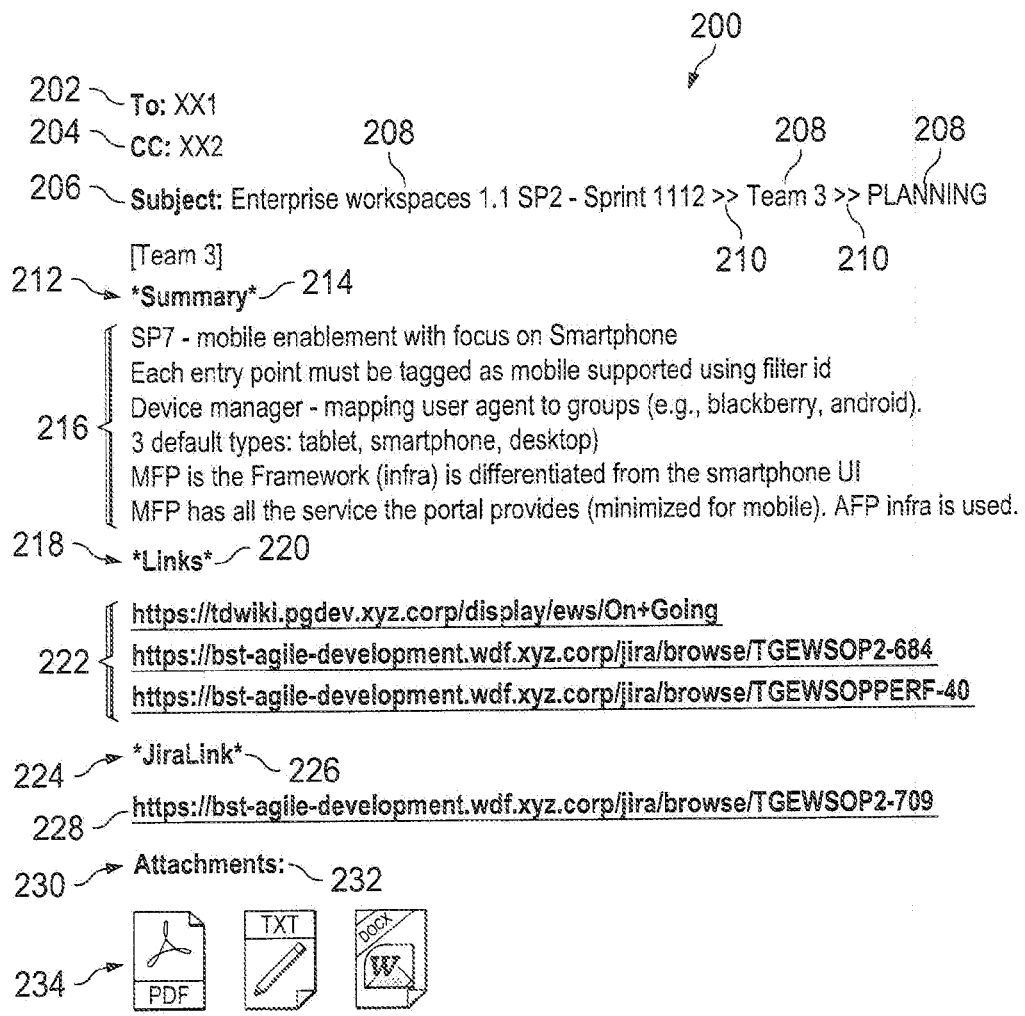
FIG. 2 illustrates an example of unstructured data that may be imported into a virtual workspace.

FIG. 2 illustrates an example of unstructured data that may be imported into a virtual workspace. In this example, the unstructured data is contained in an electronic communication 200. Electronic communication 200 is illustrated as an email, however, other implementations of electronic communication 200 may include a text message, an IM, or other forms of electronic communications.

The illustrated electronic communication 200 includes a recipient list 202, a copied recipient list 204, a subject line 206, and multiple data modules (e.g., text data, link data, URL data, and attachment data) as described below. Generally, the recipient list 202 and the copied recipient list 204 describe one or more enterprise users and/or functional accounts (e.g., communication account) to which the electronic communication 200 is sent. For example, in some aspects, one of the recipients in the recipient list 202 is a functional communication account that is monitored for incoming content to be added to EWS content in an EWS system. As described above, uses included in the recipient list 202 and/or copied recipient list 204 may be assigned one or more roles and/or permissions based on, for instance, the particular list 202 or 204 in which the user is included.

The illustrated subject line 206 includes multiple keywords 208 separated by keyword symbols 210. As described herein, such data in the subject line 205 may be parsed according to the keywords 208 and keyword symbols 210 and arranged in EWS content. Although the keyword symbols 210 are illustrated as ">>", other alphanumeric characters or other symbols may be used, either singularly or in combination.

The illustrated electronic communication 200 includes a text module 212 that is defined by a text heading 214. As illustrated, the text heading 214 includes symbols that bracket a keyword title ("Summary") of the text module 212. Although the symbols are illustrated as "*", other alphanumeric characters or other symbols may be used, either singularly or in combination. Further, although shown as bracketing the keyword title of the text module 212, singular symbols may be used in some aspects to define the keyword title. As illustrated, one or more lines of text data 216 (e.g., any combination of alphanumeric characters and/or symbols) may be included within the text module 212.

The illustrated electronic communication 200 includes a links module 218 that is defined by a links heading 220. As illustrated, the links heading 220 includes symbols that bracket a links title ("Links") of the links module 218. Although the symbols are illustrated as "*", other alphanumeric characters or other symbols may be used, either singularly or in combination. Further, although shown as bracketing the links title of the links module 218, singular symbols may be used in some aspects to define the links title. As illustrated, one or more lines of links data 222 (e.g., URL data or other hyperlink data) may be included within the links module 218.

The illustrated electronic communication 200 includes a URL module 224 that is defined by a URL heading 226. The URL module 224, generally, may include or be generated from a user-defined URL only, with the URL's content being displayed in the module area. In some implementations, a particular pre-defined URL module may be provided by default. In the illustrated example, the URL module 224 consists of the JIRA on-demand application. In this illustrated example, JIRA includes an issue tracking software developed and owned by ATLASSIAN, which may be used for bug tracking, issue tracking, and project management. In some implementations, the URL module 224 may be configured to display the JIRA Links in the module 224. Thus, a user may implement and/or write a particular module and implement the JIRA APIs to read the links in the module (e.g., rather than a default set of links). Alternatively, the URL module 224 may refer to another web-based application and may display a web content in it based on a given URL address, for example, JIRA (as in the present example) or GOOGLE.

As illustrated, the URL heading 226 includes symbols that bracket a URL title (in this example, "JiraLinks") of the URL module 224. Although the symbols are illustrated as "*", other alphanumeric characters or other symbols may be used, either singularly or in combination. Further, although shown as bracketing the URL title of the URL module 224, singular symbols may be used in some aspects to define the URL title. As illustrated, one or more lines of URL data 228 (e.g., URL data, other hyperlink data, or other data associated with JIRA) may be included within the URL module 228.

The illustrated electronic communication 200 includes an attachments module 230 that is defined by an attachments heading 232. As illustrated, the attachments heading 232 includes a symbol after an attachments title ("Attachments") of the attachments module 230. Although the symbol is illustrated as ":", other alphanumeric characters or other symbols may be used, either singularly or in combination, such as, for example, using "*" to bracket the attachments title. As illustrated, one or more attachment files 234 (shown as example .pdf, .txt, and .doc files) may be included within the attachments module 230.

Figure 3:
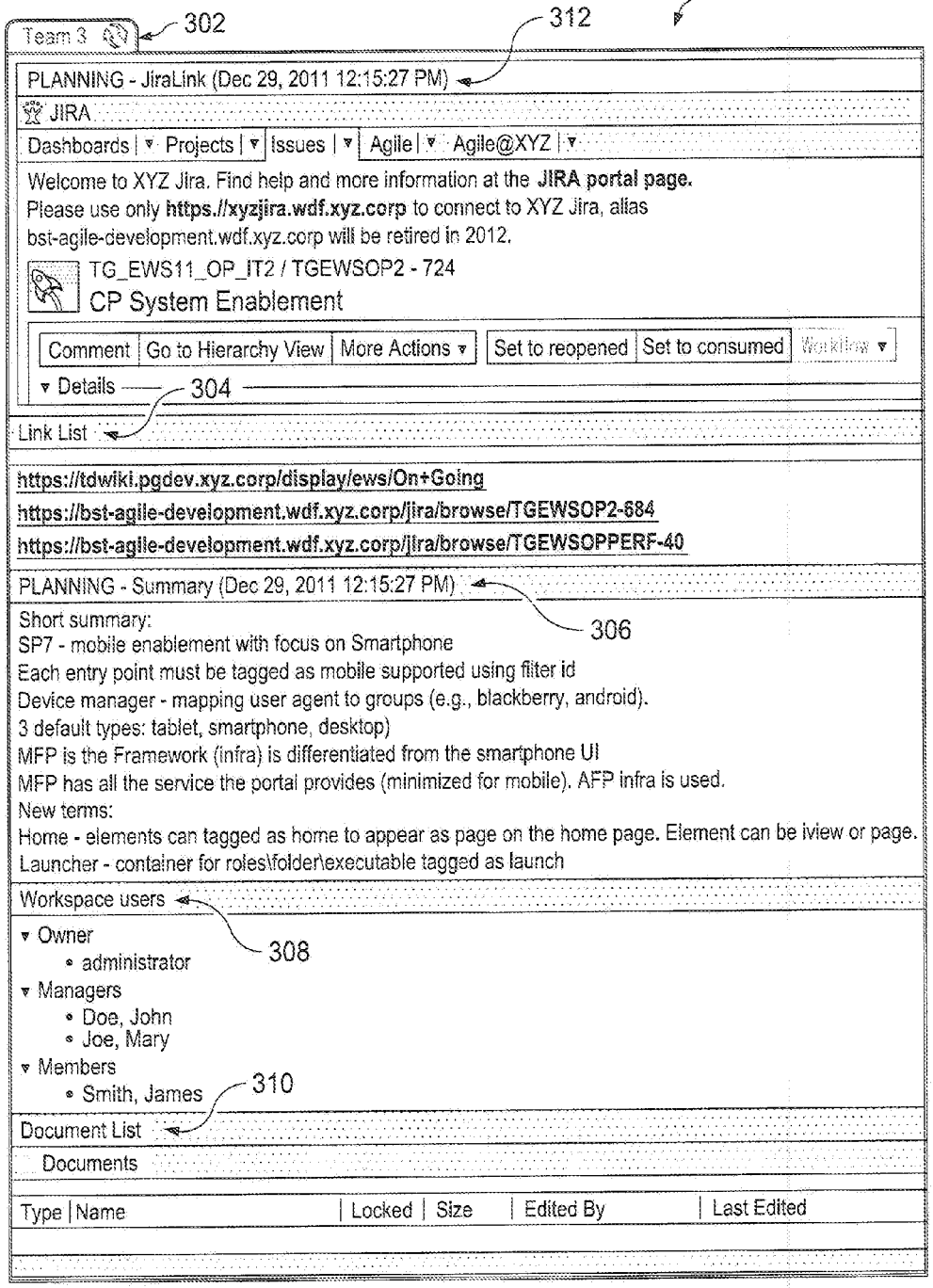
FIG. 3 illustrates an example of workspace content generated from unstructured data imported into a virtual workspace.

FIG. 3 illustrates an example of EWS content generated from unstructured data imported into a virtual workspace. For example, as described more fully below with respect to FIGS. 4A-4B, EWS content 300 may be generated based on unstructured data content in the example electronic communication 200 shown in FIG. 2. In some aspects, the illustrated EWS content 300 may be an EWS page in an EWS. In alternatively aspects, the illustrated EWS content 300 may be an EWS module on an EWS page in an EWS.

The example EWS content 300 includes a team portion 302 that, in the illustrated example, represents an EWS page. In some aspects, a new EWS page may be generated based on receipt of the electronic communication. Alternatively, unstructured data contained in the electronic communication may be added to existing EWS content (e.g., an existing EWS, EWS page, EWS module, or other EWS content).

The example EWS content 300 includes a links portion 304. In the illustrated links portion 304, one or more linked URLs are included. In some aspects, the links portion 304 may include any hyperlinked path, whether to a URL, virtual location in an enterprise system, or otherwise.

The example EWS content 300 includes a text portion 306. In the illustrated text portion 306, one or more lines of textual data is included. The textual data may include any appropriate content related to the EWS content 300.

The example EWS content 300 includes a user portion 308. In the illustrated user portion 308, recipient information from an electronic communication (e.g., electronic communication 200) may be included, along with, for example, roles associated with each recipient. For instance, as illustrated, the roles of "Owner," "Managers," and "Members" are listed, along with user names listed under each role. In some aspects, predefined permissions associated with each role may be illustrated in the user portion 308.

The example EWS content 300 includes a document portion 310. Generally, the document portion 310 may contain links (e.g., hyperlinks) to one or more files, attachments, or documents associated with the EWS content 300. Such files, attachments, or documents, may be listed in the document portion 310 and selectable by an EWS user. For example, in some aspects, the files have been attached to an electronic communication received at a communication account of an EWS server (e.g., associated with an EWS user). The communication account, in some aspects, may have an addressable account that may be listed as a recipient in the electronic communication (e.g., "XX1" as shown in FIG. 2).

The illustrated EWS content 300 also include a heading portion 312. The heading portion 312, in some implementations, may provide a snapshot of the EWS content 300 for a user. For example, the heading portion 312 may include tabs, general information, and other data that facilitates navigation through the EWS content 300. In some aspects, the heading portion 312 may be customizable by an administrator to provide particular information to an EWS user of the EWS content 300.

Figure 4A:
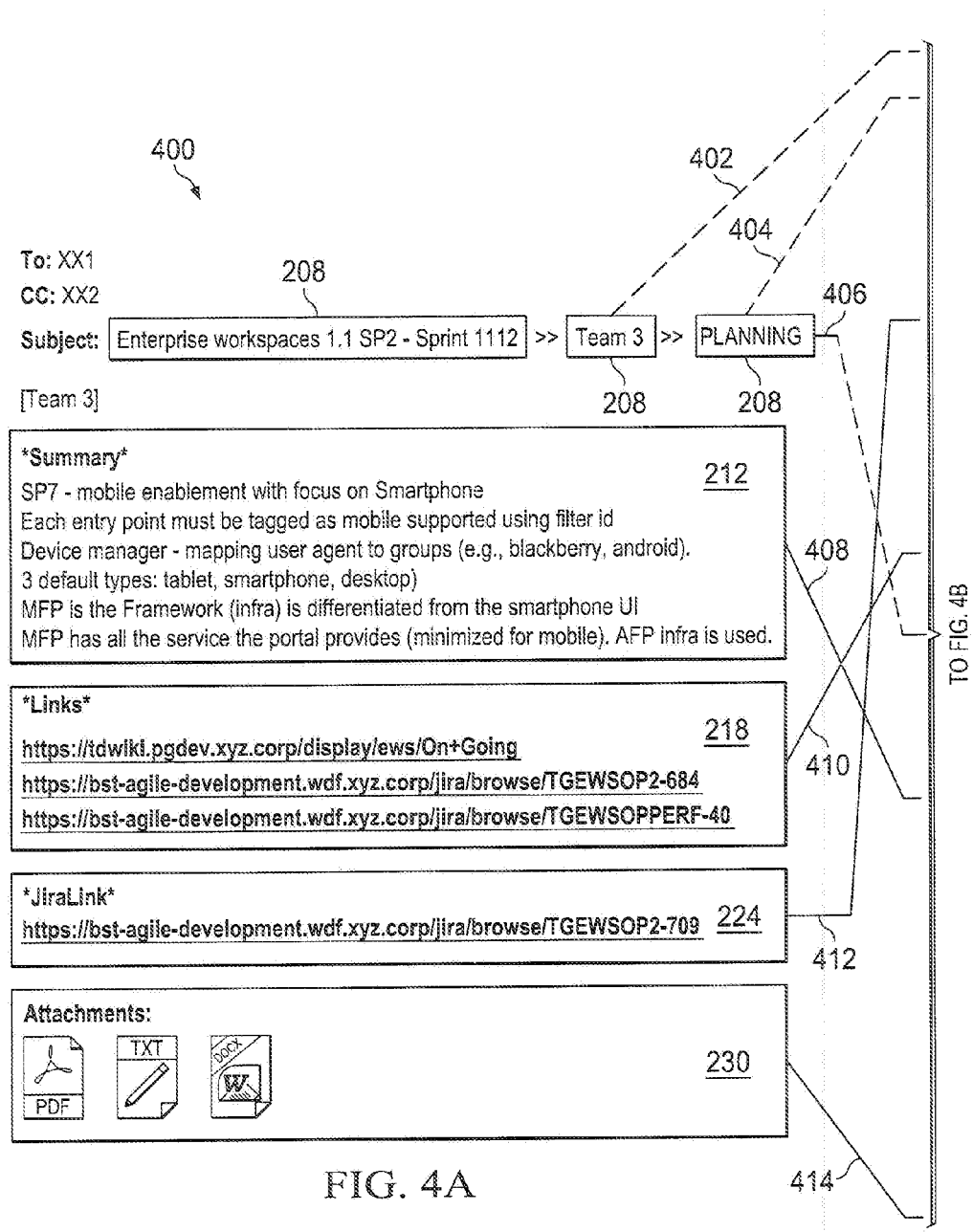

FIGS. 4A-4B illustrate an example graphic mapping 400 between unstructured data and data displayable in a virtual workspace. At a high level, the graphic mapping 400 illustrates unstructured data from an electronic communication (e.g., electronic communication 200) that has been manipulated into EWS content in an EWS (e.g., EWS content 300).

As illustrated, one or more keywords 208 may be mapped to EWS content. For example, the keyword 208 "Team 3" may be mapped 402 to the heading portion 302 in the EWS content (e.g., as an EWS page). The keyword 208 "PLANNING" may be mapped 404 to the heading portion 302 and may also be mapped 406 to a title of the text portion 306.

As further illustrated, the text module 212 may be mapped 408 to text that is contained in the text portion 306 of the EWS content. The links module 218 may be mapped 410 to the links portion 304 of the EWS content. The attachments module 230 may be mapped to the document portion 310 in the EWS content.

In the illustrated implementation, the URL module 224 may be mapped 412 to EWS content. For example, in the illustrated example, a JiraLinks module may use JIRA APIs to read its links and display them in the heading portion 312, and map 412 the content to the heading portion 312. As described above, however, the JiraLinks module is an example, and other web applications may be implemented as well.

FIG. 5 is a flow chart illustrating an example method 500 for managing content of a virtual workspace. In some implementations, method 500 may be performed with the distributed computing system 100 illustrated in FIG. 1. Alternatively, method 500 may be performed with another computing system without departing from the scope of this disclosure.

Method 500 may begin at step 502, when an electronic communication addressed to a communication account associated with an enterprise computing system. In some implementations, the account may be associated with a particular user, group of users, client (e.g., computing device), or otherwise. In some implementations, the electronic communication may be an email communication, a text message, an IM, or other addressable electronic communication. The electronic communication may include unstructured data, such as, for example, subject data, recipient information, text data, and/or attachment files.

In step 504, unstructured data content from the electronic communication is parsed to determine one or more keywords defined by one or more specified keyword symbols. For example, certain terms in the unstructured data may be identified according to symbols (e.g., *, >, <, %, or other symbols or alphanumeric characters) that offset, bracket, or are positioned next to the term(s). In some implementations, for example, a particular keyword is identified, for example, due to its inclusion between (e.g., bracketed) two specified keyword symbols. Once identified, a type may be assigned to the keyword based on, for instance, the particular symbols that bracket the keyword. For example, using the example electronic communication 200 shown in FIG. 2, the term "Summary" may be identified as a keyword due to its position between the symbols "*." The term may then be assigned a type as "text" for inclusion, for instance, in a text portion of EWS content (e.g., text portion 306). In some implementations, the type of the keyword may be, for example, an EWS type, an EWS page type, or an EWS module type.

In step 506, an EWS object (e.g., a serialized content object) is created based on the keywords and the unstructured data content. In some implementations, for example, the EWS object may consist of a JAVA standard serialization object (or other type of binary file). For example, the EWS object may contain the keywords and unstructured data content in a serialized form (e.g., a text string) that may more easily be converted to EWS content.

In step 508, EWS content is generated from the EWS object. For example, in some implementations, new EWS content is created with, for example, portions (e.g., portions 302, 304, 306, 308, and/or 310) generated based on the keywords. Then, the unstructured data is inserted into the appropriate generated portions to create the EWS content. For example, in some implementations, a text portion may be created with unstructured text data, an attachments portion may be created with unstructured links to attachments, as well as other portions. In step 510, the EWS content generated in step 508 is prepared for display to an EWS user (e.g., through a GUI in a client computing device of a distributed computing system).

In step 512, one or more of a recipient, sender, and/or copied recipient (e.g., CC, BCC) of the electronic communication is identified. In step 514, the identified one or more of the recipient, sender, and/or copied recipient is assigned a role associated with the generated EWS content. For example, in some implementations, the assigned role may be "owner/administrator" (e.g., for the sender), a "manager" (e.g., for the recipient(s)), and a "member" (e.g., for the copied recipient(s)). Alternatively, other roles and/or other combinations of roles may be assigned as appropriate.

In step 516, for instance, once roles have been assigned, a permission level of the EWS content may be assigned according to the assigned roles. For example, in some implementations, the role of owner/administrator may have full viewing and full editing permissions; the role of manager may have full viewing and limited editing permissions; and the role of member may have full viewing and no editing permissions. Alternatively, in some implementations, different may be assigned to such roles. Further, the permissions may be customizable by, for example, the owner/administrator.

In step 519, a determination is made whether a request has been received (e.g., at an EWS server) to export EWS content (e.g., an EWS, one or more EWS pages, and/or one or more EWS modules) from an EWS server to, for example, a client communicably coupled to the EWS server. For example, in some implementations, a user working with EWS content in an EWS may simply initiate a request by selecting an option in the EWS itself and identifying the particular content to be exported. If a request has not been received, method 500 may return to step 502.

If a request has been received in step 518, then the EWS content included within and/or linked in the request is identified in step 520. For example, EWS content may be identified by a name or other identifier of the EWS, EWS page(s), EWS module(s), or other EWS content identified in the request. In some implementations, the identified EWS content may contain and/or reference structured data that is typically displayed in the EWS.

In step 522, the EWS content identified in the request (e.g., the structured data) is parsed into electronic communication content (e.g., content for an email, text message, IM, or other electronic message content). For example, in some implementations, the structured data is parsed according to keyword titles of one or more portions (e.g., portions 302, 304, 306, 308, and/or 310) of the EWS content.

In step 524, the electronic communication (e.g., email or otherwise) is generated including the content. For example, an electronic communication may be generated addressed to the EWS user who initiated the request, another EWS user, an outside communication account (e.g., external to the distributed computing system that includes the EWS server), or simply left unaddressed. In some aspects, the electronic communication is generated and automatically sent to the addressed account. Alternatively, an EWS user may further customize the electronic communication prior to initiating transmission of the communication.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. Further, processes and methods (e.g., method 500) described herein for managing content of a virtual workspace may be performed in different orders and/or may include either additional or fewer steps than those illustrated without departing from the scope of the disclosure. Accordingly, the above description of example implementations does not define or constrain this disclosure. Other changes, substitutions, and alterations are also possible without departing from the spirit and scope of this disclosure.

What is claimed is:

1. A computer-implemented method for managing content of a virtual workspace, the method comprising:
    identifying, by a computer, an electronic communication addressed to a communication account associated with an enterprise computing system, the electronic communication comprising unstructured data content;
    parsing, by a computer, the unstructured data content to determine one or more keywords defined by one or more specified keyword symbols, the parsing comprising:
        identifying a particular keyword arranged between two specified keyword symbols; and
        assigning a type to the particular keyword based on the two specified keyword symbols and keyword, wherein the type of the particular keyword comprises one of an enterprise workspace (EWS), an EWS page, or an EWS module, wherein the EWS page is a personal or shared container item defining a layout to structure a position of the EWS module, and wherein the EWS module is a content item that runs in the EWS page, can respond to EWS events, and is parameterized to permit changes to back-end data and a property set associated with the EWS module;
    creating, by a computer, an EWS object based on the determined one or more keywords and the unstructured data content, wherein the EWS object contains the determined one or more keywords and the unstructured data content in serialized form;
    generating, by a computer, EWS content from the EWS object;
    preparing, by a computer, the generated EWS content for display to an enterprise user; and
    assigning a role associated with the EWS content based on an identified at least one of a recipient of the electronic communication, a sender of the electronic communication, or a copied recipient of the electronic communication.

2. The computer-implemented method of claim 1, wherein the electronic communication comprises an electronic mail (email) communication, and the unstructured data content comprises at least one of email subject data, email recipient data, email body text data, and email attachment data.

3. The computer-implemented method of claim 1, further comprising:
    identifying at least one of the recipient of the electronic communication, the sender of the electronic communication, or the copied recipient of the electronic communication.

4. The computer-implemented method of claim 1, wherein the assigned role is one of:
    an owner of the EWS content based on an identification of the sender of the electronic communication;
    a manager of the EWS content based on an identification of the recipient of the electronic communication; or
    a member of the EWS content based on an identification of the copied recipient of the electronic communication.

5. The computer-implemented method of claim 1, further comprising:
    setting a permission level of the EWS content based on the assigned role.

6. The computer-implemented method of claim 1, further comprising:
    identifying, from the enterprise user, a request for export of a second EWS content from the virtual workspace, the second EWS content comprising structured data content defined by one or more headings;
    parsing the structured data into one or more portions of a different electronic communication based on the one or more headings; and
    generating the different electronic communication comprising the one or more portions for transmission to a different enterprise user.

7. A non-transitory computer storage medium encoded with a computer program, the program comprising instructions that when executed by one or more computers cause the one or more computers to perform operations comprising:
    identifying an electronic communication addressed to a communication account associated with an enterprise computing system, the electronic communication comprising unstructured data content;
    parsing the unstructured data content to determine one or more keywords defined by one or more specified keyword symbols, the parsing comprising:
        identifying a particular keyword arranged between two specified keyword symbols; and
        assigning a type to the particular keyword based on the two specified keyword symbols and keyword, wherein the type of the particular keyword comprises one of an enterprise workspace (EWS), an EWS page, or an EWS module, wherein the EWS page is a personal or shared container item defining a layout to structure a position of the EWS module, and wherein the EWS module is a content item that runs in the EWS page, can respond to EWS events, and is parameterized to permit changes to back-end data and a property set associated with the EWS module;
    creating an EWS object based on the determined one or more keywords and the unstructured data content, wherein the EWS object contains the determined one or more keywords and the unstructured data content in serialized form;
    generating EWS content from the EWS object;
    preparing the generated EWS content for display to an enterprise user; and
    assigning a role associated with the EWS content based on an identified at least one of a recipient of the electronic communication, a sender of the electronic communication, or a copied recipient of the electronic communication.

8. The computer storage medium of claim 7, wherein the electronic communication comprises an electronic mail (email) communication, and the unstructured data content comprises at least one of email subject data, email recipient data, email body text data, and email attachment data.

9. The computer storage medium of claim 7, wherein the operations further comprise:
identifying at least one of the recipient of the electronic communication, the sender of the electronic communication, or the copied recipient of the electronic communication.

10. The computer storage medium of claim 7, wherein the assigned role is one of:
an owner of the EWS content based on an identification of the sender of the electronic communication;
a manager of the EWS content based on an identification of the recipient of the electronic communication; or
a member of the EWS content based on an identification of the copied recipient of the electronic communication.

11. The computer-implemented method of claim 7, further comprising:
setting a permission level of the EWS content based on the assigned role.

12. The computer storage medium of claim 7, wherein the operations further comprise:
identifying, from the enterprise user, a request for export of a second EWS content, the second EWS content comprising structured data content defined by one or more headings;
parsing the structured data into one or more portions of a different electronic communication based on the one or more headings; and
generating the different electronic communication comprising the one or more portions for transmission to a different enterprise user.

13. A system of one or more computers configured to perform operations comprising:
identifying an electronic communication addressed to a communication account associated with an enterprise computing system, the electronic communication comprising unstructured data content;
parsing the unstructured data content to determine one or more keywords defined by one or more specified keyword symbols, the parsing comprising:
identifying a particular keyword arranged between two specified keyword symbols; and
assigning a type to the particular keyword based on the two specified keyword symbols and keyword, wherein the type of the particular keyword comprises one of an enterprise workspace (EWS), an EWS page, or an EWS module, wherein the EWS page is a personal or shared container item defining a layout to structure a position of the EWS module, and wherein the EWS module is a content item that runs in the EWS page, can respond to EWS events, and is parameterized to permit changes to back-end data and a property set associated with the EWS module;
creating an EWS object based on the determined one or more keywords and the unstructured data content, wherein the EWS object contains the determined one or more keywords and the unstructured data content in serialized form;
generating EWS content from the EWS object;
preparing the generated EWS content for display to an enterprise user; and
assigning a role associated with the EWS content based on an identified at least one of a recipient of the electronic communication, a sender of the electronic communication, or a copied recipient of the electronic communication.

14. The system of claim 13, wherein the electronic communication comprises an electronic mail (email) communication, and the unstructured data content comprises at least one of email subject data, email recipient data, email body text data, and email attachment data.

15. The system of claim 13, wherein the operations further comprise:
identifying at least one of the recipient of the electronic communication, the sender of the electronic communication, or the copied recipient of the electronic communication.

16. The system of claim 13, wherein the assigned role is one of:
an owner of the EWS content based on an identification of the sender of the electronic communication;
a manager of the EWS content based on an identification of the recipient of the electronic communication; or
a member of the EWS content based on an identification of the copied recipient of the electronic communication.

17. The system of claim 13, further comprising:
setting a permission level of the EWS content based on the assigned role.

18. The system of claim 13, wherein the operations further comprise:
identifying, from the enterprise user, a request for export of a second EWS content, the second EWS content comprising structured data content defined by one or more headings;
parsing the structured data into one or more portions of a different electronic communication based on the one or more headings; and
generating the different electronic communication comprising the one or more portions for transmission to a different enterprise user.

* * * * *